United States Patent
Tamaki et al.

(10) Patent No.: US 12,058,018 B2
(45) Date of Patent: Aug. 6, 2024

(54) SYSTEMS AND METHODS FOR COLLECTING METADATA AND SENSOR TERMINALS

(71) Applicant: Nippon Telegraph and Telephone Corporation, Tokyo (JP)

(72) Inventors: Shinya Tamaki, Musashino (JP); Ryota Shiina, Musashino (JP); Tetsuya Suzuki, Musashino (JP); Yasutaka Kimura, Musashino (JP); Tomohiro Taniguchi, Musashino (JP); Sei Kou, Musashino (JP); Tomoya Hatano, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 18/026,638

(22) PCT Filed: Sep. 30, 2020

(86) PCT No.: PCT/JP2020/037107
§ 371 (c)(1),
(2) Date: Mar. 16, 2023

(87) PCT Pub. No.: WO2022/070295
PCT Pub. Date: Apr. 7, 2022

(65) Prior Publication Data
US 2023/0336448 A1   Oct. 19, 2023

(51) Int. Cl.
*H04L 43/08*        (2022.01)
*G16Y 20/20*        (2020.01)
*G16Y 40/10*        (2020.01)

(52) U.S. Cl.
CPC .............. *H04L 43/08* (2013.01); *G16Y 20/20* (2020.01); *G16Y 40/10* (2020.01)

(58) Field of Classification Search
CPC .......... H04L 43/08; G16Y 20/20; G16Y 40/10
See application file for complete search history.

(56) References Cited

U.S. PATENT DOCUMENTS

| 9,600,571 B2 * | 3/2017 | Shaashua | G06N 20/00 |
| 9,935,887 B1 * | 4/2018 | Maharia | H04L 47/365 |
| 2021/0326331 A1 * | 10/2021 | Shin | G06F 16/2379 |

FOREIGN PATENT DOCUMENTS

JP   2009260778   11/2009

OTHER PUBLICATIONS

LAN/MAN Standards Committee of the IEEE Computer Society, "IEEE Standard for Local and metropolitan area networks-Station and Media Access Control Connectivity Discovery," IEEE Std 802.1AB™, Mar. 11, 2016, 146 pages.

(Continued)

*Primary Examiner* — Adnan M Mirza
(74) *Attorney, Agent, or Firm* — Fish & Richardson P.C.

(57) ABSTRACT

An object of the present disclosure is to collectively collect sensing data and metadata regarding normality of equipment by utilizing light communication protocol.

The present disclosure is a system that collects sensing data from a sensor terminal in a data collection unit using a data collection network, the sensor terminal including a detection unit configured to detect metadata regarding internal information of the sensor terminal other than a sensor device that detects sensing data and equipment information and transmitting the metadata detected by the detection unit using an extended area or an optional area defined in communication protocol for transmitting the sensing data or the equipment information in a frame defined in the communication protocol, and the data collection unit associating the sensing (Continued)

data, the equipment information, and the metadata on the basis of information for identifying the sensor terminal described in the frame.

19 Claims, 5 Drawing Sheets

(56) References Cited

OTHER PUBLICATIONS

Mihara et al., "Designing HTIP which Identifies Home Network Topology and Applying HTIP to a Troubleshooting Application," Information Processing Society Journal Consumer Device & System, 2012, 2(3):34-45, 25 pages (with English Translation).
Oda et al., "An Approach of Defining, Generating and Utilizing Metadata for Sensing Data Trading Market," The 32nd Annual Conference of the Japanese Society for Artificial Intelligence, Jun. 5, 2018, 5 pages (with English Translation).
Tamaki et al., "Proposal of Low Layer Metadata Collection Method for IoT Data Trustworthiness," 2020 General Conference of the Institute of Electronics, Information and Communication Engineers, Mar. 17, 2020, pp. 163, 3 pages (with English Translation).
The Telecommunication Technology Committee, "JJ-300.00 HTIP: Home-network Topology identifying protocol," TTC Standard Version 3.0, May 25, 2017, 101 pages (with English Translation).

* cited by examiner

SYSTEMS AND METHODS FOR COLLECTING METADATA AND SENSOR TERMINALS

CROSS-REFERENCE TO RELATED APPLICATIONS

This application is a National Stage application under 35 U.S.C. § 371 of International Application No. PCT/JP2020/037107, having an International Filing Date of Sep. 30, 2020.

The disclosure of the prior application is considered part of the disclosure of this application, and is incorporated by reference in its entirety into this application.

TECHNICAL FIELD

The present disclosure relates to collection of internal information such as self-diagnosis information of an Internet of Things (IoT) terminal.

BACKGROUND ART

A method for acquiring internal information (self-diagnosis information such as a CPU usage rate/a memory usage amount/a voltage, and the like) of a terminal in communication protocol that does not require high performance has been reported. For example, in Non Patent Literature 1, network configuration information and equipment information of a terminal and equipment are collected using a link layer discovery protocol data unit (LLDPDU) of link layer discovery protocol (LLDP).

In IoT, it is necessary to connect a large number of sensor terminals via a network and collect data (sensing data) generated by the sensor terminals. In addition, it has been reported in data utilization in IoT that not only sensing data itself generated by a sensor terminal but also data related to sensing data called metadata are important (Non Patent Literature 2, and the like), and it is expected that a user can safely and easily utilize the sensing data by acquiring and distributing the sensing data and the metadata together. For example, by applying the method of Non Patent Literature 1, equipment information such as manufacturer name and model number related to sensing data can be collected with an economical system configuration.

CITATION LIST

Non Patent Literature

Non Patent Literature 1: Yoshiyuki Mihara, Takefumi Yamazaki, Manabu Okamoto, Atsushi Sato, "Designing HTIP which Identifies Home Network Topology and Applying HTIP to a Troubleshooting Application", Journal of the Information Processing Society of Japan, Consumer Device & System, Vol. 2, No. 3, pp. 34-45, December 2012.

Non Patent Literature 2: Toshihiko Oda, Hiroshi Imai, Takeshi Naito, Hajime Takebayashi, "An Approach of Defining, Generating and Utilizing Metadata for Sensing Data Trading Market", 2018 National Convention of the Society of Artificial Intelligence (32 times), June 2012.

Non Patent Literature 3: IEEE Std 802.1AB-2016, "IEEE Standard for Local and metropolitan area networks-Station and Media Access Control Connectivity Discovery"

Non Patent Literature 4: TTC standard JJ-300.00, "Home-network Topology Identifying Protocol, 3.0 edition", May 25, 2017

SUMMARY OF INVENTION

Technical Problem

Meanwhile, metadata includes not only equipment information such as product name and model number but also information regarding a state and normality/abnormality of a sensor terminal itself [see, for example, Non Patent Literature 2]. As a method for collecting metadata other than the equipment information, it is conceivable to develop/construct a dedicated system and collect the metadata or to manually collect the metadata and associate the metadata with sensing data that is separately collected. However, the following problems are assumed.
  (1) It is necessary to provide another sensor equipment that monitors a sensor terminal and monitor a state.
  (2) Development/construction of a plurality of systems or manual confirmation of the state of the sensor terminal causes increase in cost and makes operation complicated.
  (3) When sensing data acquired by individual methods is associated with metadata, an error such as a human error may occur.

While a collection method that solves these problems is expected, specific means has not been clear. It is therefore an object of the present disclosure to collectively collect sensing data and metadata regarding normality of a sensor terminal by utilizing light communication protocol.

Solution to Problem

In order to solve the above problems, the present disclosure collects metadata including an internal state of equipment by using an extended function or an optional function of communication protocol to be used for collecting sensing data generated by a sensor terminal or collecting equipment information.

Specifically, a system according to the present disclosure is a system that collects sensing data from a sensor terminal in a data collection unit using a data collection network,
  the sensor terminal including a detection unit configured to detect metadata regarding internal information of the sensor terminal other than a sensor device that detects sensing data and equipment information and transmitting the metadata detected by the detection unit using an extended area or an optional area defined in communication protocol for transmitting the sensing data or the equipment information in a frame defined in the communication protocol, and
  the data collection unit associating the sensing data, the equipment information, and the metadata with each other on the basis of information for identifying the sensor terminal described in the frame.

Specifically, a method according to the present disclosure is a method to be executed by a system that collects sensing data from a sensor terminal in a data collection unit using a data collection network,
  the sensor terminal including a detection unit configured to detect metadata regarding internal information of the sensor terminal other than a sensor device that detects sensing data and equipment information and transmitting the metadata detected by the detection unit using an extended area or an optional area defined in communication protocol for transmitting the sensing data or the equipment information in a frame defined in the communication protocol, and the data collection unit associating the sensing data, the equipment information, and the metadata with each other on the basis of information for identifying the sensor terminal described in the frame.

Specifically, the sensor terminal according to the present disclosure is a sensor terminal that transmits sensing data to a data collection unit using a data collection network, the sensor terminal including a detection unit configured to detect metadata regarding internal information of the sensor terminal other than a sensor device that detects sensing data and equipment information, and transmitting the metadata detected by the detection unit using an extended area or an optional area defined in communication protocol for transmitting the sensing data or the equipment information in a frame defined in the communication protocol.

Advantageous Effects of Invention

The present disclosure can collectively collect sensing data and metadata regarding normality of equipment by utilizing light communication protocol.

DESCRIPTION OF EMBODIMENTS

An embodiment of the present disclosure will be described in detail below with reference to the drawings. Note that the present disclosure is not limited to the following embodiment. The embodiment is merely an example, and the present disclosure can be carried out in a form with various modifications and improvements on the basis of knowledge of those skilled in the art. Note that components having the same reference numerals in the present specification and the drawings indicate the same components.

First Embodiment

Figure 1:
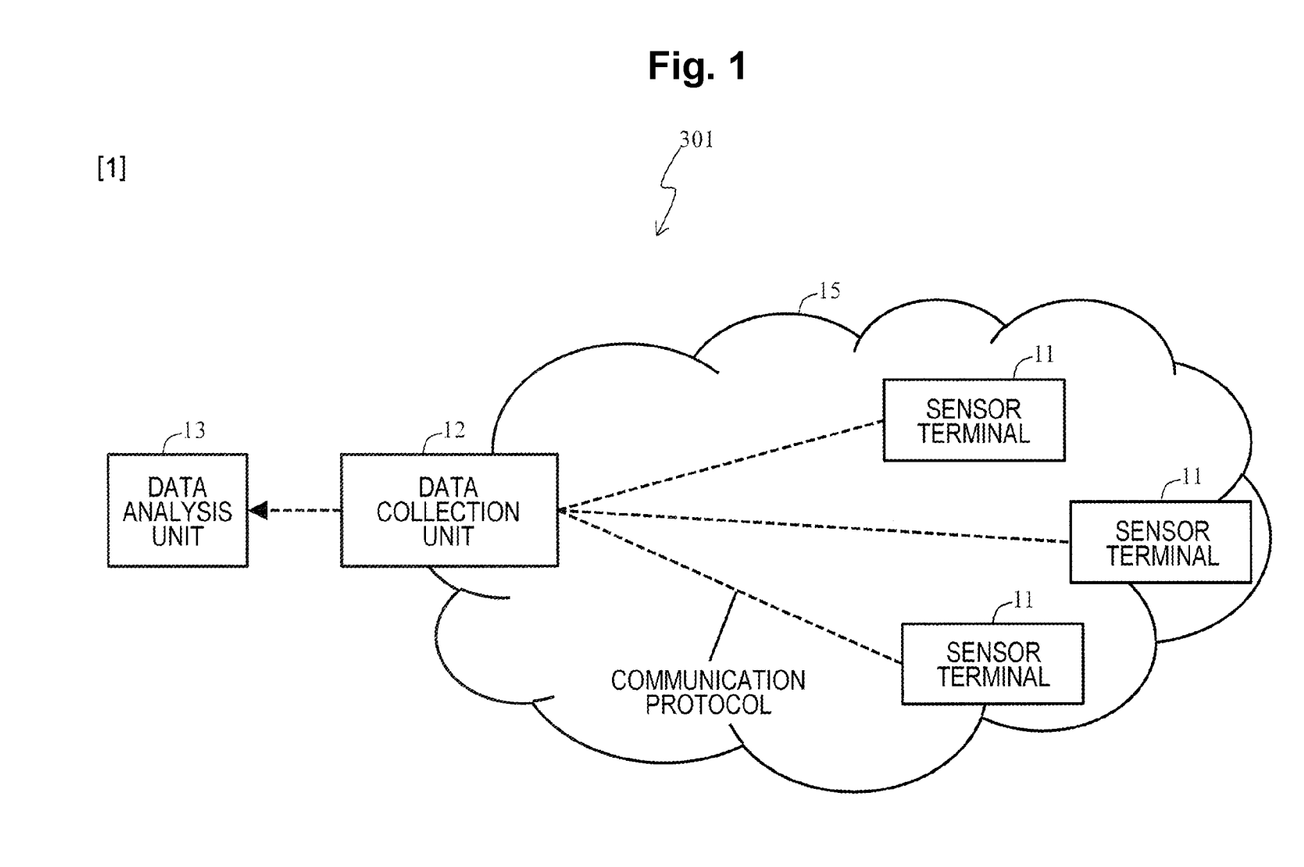
FIG. 1 illustrates an example of a system configuration.

FIG. 1 illustrates a configuration example of a system. The system of the present disclosure includes a plurality of sensor terminals 11, a data collection unit 12, and a data analysis unit 13. The plurality of sensor terminals 11 constitute a data collection network 15. The data collection unit 12 is connected to each sensor terminal 11 via the data collection network 15.

The data analysis unit 13 and the data collection unit 12 may be disposed in the same apparatus or may be disposed in separate apparatuses. In a case where the data analysis unit 13 and the data collection unit 12 are disposed in separate apparatuses, the data analysis unit 13 and the data collection unit 12 may be disposed at distant places via a network. The apparatus of the present disclosure, for example, the sensor terminal 11, the data collection unit 12, and the data analysis unit 13 can also be implemented by a computer and a program, and the program can be recorded on a recording medium or provided through a network.

The sensor terminal 11 performs sensing regarding an object to be observed and generates sensing data. In the sensor terminal 11, a single type of sensor terminals 11 may exist in the same data collection network 15, or a plurality of types of sensor terminals 11 may exist.

The data collection unit 12 collectively passes sensing data and metadata collected from the sensor terminals 11 to the data analysis unit 13. As the data collection unit 12, any apparatus capable of transferring data from the data collection network 15 can be used, and for example, an IoT gateway, an access point, or various kinds of housing apparatuses can be used.

The data collection network 15 connects the sensor terminals 11 existing in a specific range and includes a so-called local area network (LAN), a field area network (FAN), an IoT area network, and the like.

The data collection network 15 collectively transmits sensing data, equipment information and metadata generated by the sensor terminal 11 to the data collection unit 12 via communication protocol. The metadata includes internal information of the sensor terminal 11. The communication protocol includes various kinds of protocol for data communication such as wireless (Wi-Fi, low power wide area (LPWA)), conductive wire (Ethernet, planar lightwave circuit (PLC), single pair Ethernet), and optical fiber (Ethernet, passive optical network (PON)), various kinds of protocol for collecting equipment information such as LLPD, home network protocol such as home network topology identifying protocol (HTIP), and the like. In the same data collection network 15, a single kind of communication protocol may be used, or a plurality of kinds of communication protocol may be used.

Figure 2:
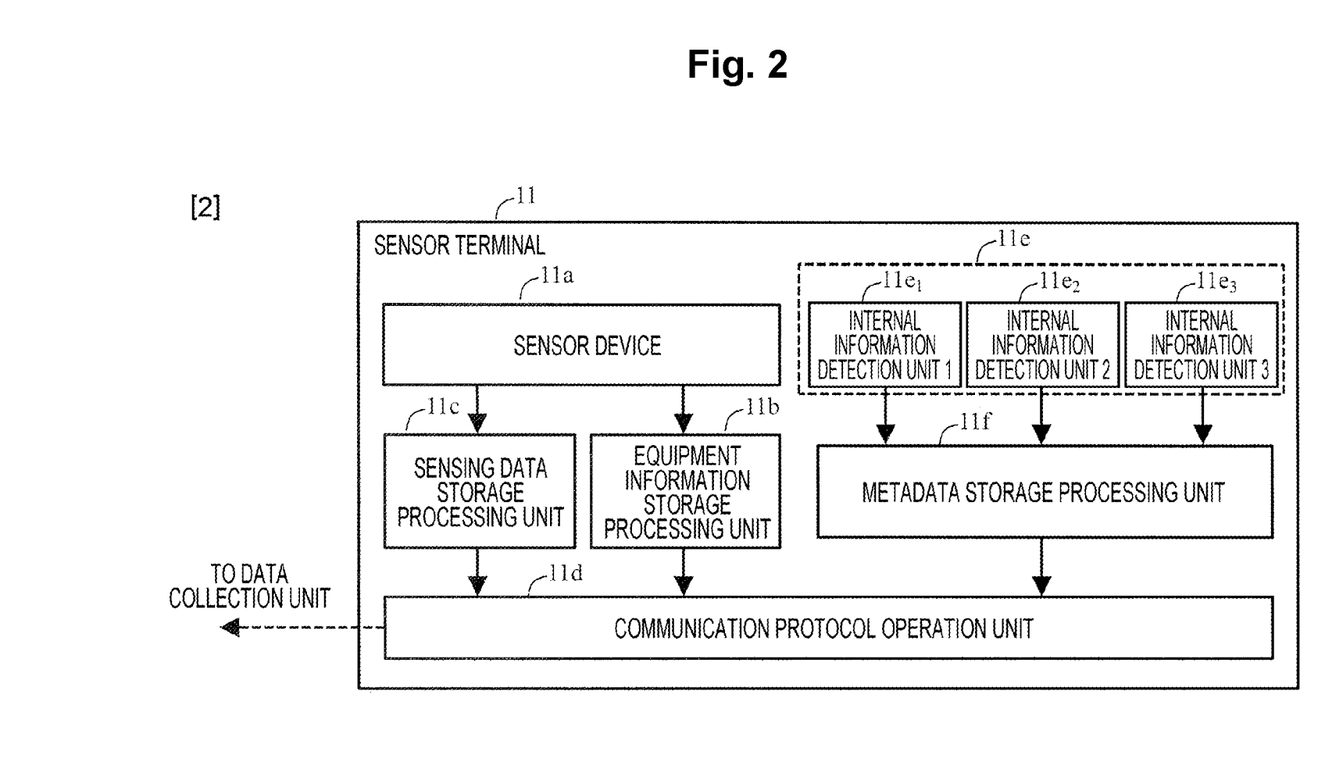
FIG. 2 illustrates a configuration example of a sensor terminal.

FIG. 2 illustrates a configuration example of the sensor terminal 11. The sensor terminal 11 includes a sensor device 11a, an equipment information storage processing unit 11b, a sensing data storage processing unit 11c, a communication protocol operation unit 11d, a detection unit 11e, and a metadata storage processing unit 11f. The sensor device 11a performs sensing regarding an object to be observed. The equipment information storage processing unit 11b collects the equipment information (for example, manufacturer name, model name, model number, and the like, of the equipment) about an object to be observed and stores the information at a predetermined position of a frame (area that can be used for unique applications, such as an "extended area" and an "optional area" defined by protocol). The sensing data storage processing unit 11c stores the sensing data from the sensor device 11a at a predetermined position of a frame (such as a payload portion defined by protocol).

The detection unit 11e includes at least one internal information detection units 11e1, 11e2, and 11e3 that acquire internal information of the equipment. The internal information of the equipment is information regarding internal information of the sensor terminal 11 itself other than the sensor device 11a and includes arbitrary information that can be detected by the sensor terminal 11. For example, in addition to a CPU usage rate, a memory usage amount, a voltage, a current, and a data distribution amount of the sensor terminal 11, the sensing data and any self-diagnosis information regarding normality of the equipment are included. Any one or all of the internal information detection units 11e1, 11e2, and 11e3 may be provided in the detection unit 11e.

The internal information of the equipment transmitted from the sensor terminal 11 is not necessarily physical quantity (●● in Celsius [° C.], ●[V], etc.) information that can be used as it is. For example, raw data may be transmitted, combined with equipment-specific information such as a model in the data analysis unit 13, converted into meaningful physical quantity, and utilized.

The metadata storage processing unit 11f stores the data from each of the internal information detection units 11e1, 11e2, and 11e3 in the extended area or the optional area defined in the communication protocol. For example, in a case where the communication protocol is LLDP, the data is stored in the extended area in an optional TLV included in a data unit. In a case where the communication protocol is HTIP, the data is stored in an equipment information area included in a data area.

The metadata storage processing unit 11f may store data after processing such as converting the data into a certain shortened code or dividing (fragmenting) the data into a plurality of frames so as to conform to a form/restriction of the communication protocol to be used. The data may be sequentially stored every time the data is updated, or a record (log) after the data is accumulated for a certain period or a result of specific calculation/statistical processing may be stored. A type of the metadata/a timing of storage are not limited to a fixed type and a fixed timing and may be dynamically changed by instructions from the sensor terminal 11 side (for example, a function of the metadata storage processing unit 11f), the data analysis unit 13, and the data collection unit 12.

The communication protocol operation unit 11d transmits internal information other than the equipment information as the metadata at the time of transmission of the sensing data or the equipment information. As communication protocol for transmitting the metadata, communication protocol for transmitting the sensing data or the equipment information can be used. Transmission of the sensing data and transmission of the equipment information may be performed using the same communication protocol or different kinds of communication protocol. In the latter case, the metadata can be stored in a frame of one kind of the communication protocol or frames of both kinds of communication protocol.

Figure 3:
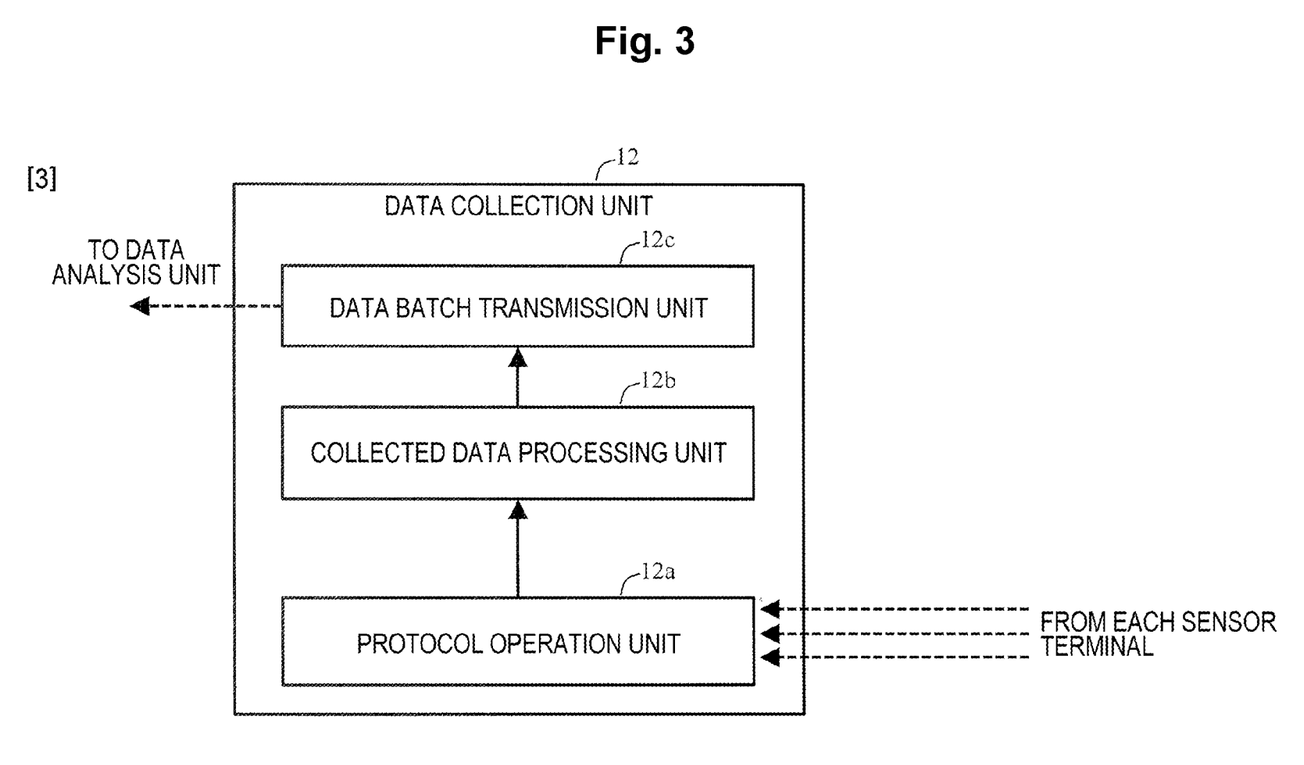
FIG. 3 illustrates a configuration example of a data collection unit.

FIG. 3 illustrates a configuration example of the data collection unit 12. The data collection unit 12 includes a data batch transmission unit 12c, a collected data processing unit 12b, and a protocol operation unit 12a. The protocol operation unit 12a receives a frame transmitted from each sensor terminal 11.

The collected data processing unit 12b organizes the sensing data, the equipment information, and the metadata (internal state information of the equipment (self-diagnosis information such as a CPU usage rate/a memory usage amount/a voltage, and the like)) other than the equipment information from each sensor terminal 11 into a database on the basis of information (for example, a media access control address (MAC) address) for identifying an individual of the sensor terminal 11. The information for identifying the individual of the sensor terminal 11 is, for example, a MAC address commonly used in the communication protocol for sensing data and the LLDP protocol. The collected data processing unit 12b associates the sensing data, the equipment information, and the metadata with each other on the basis of the MAC address. As a result, the sensing data, the equipment information, and the metadata from each sensor terminal 11 are stored in the database in association with the information for identifying the individual of the sensor terminal 11.

In addition, the collected data processing unit 12b stores the data in a payload portion of the data batch transmission unit 12c at a predetermined timing. In this event, depending on requirements of the data analysis unit 13, only some data may be transmitted, or all data may be transmitted.

The data analysis unit 13 stores information delivered from the data collection unit 12 and uses the information for analysis. For example, the data analysis unit 13 determines whether the sensor terminal 11 is normal or abnormal by using the internal information of each sensor terminal 11. For example, in a case where at least any value of the CPU usage rate, the memory usage amount, the voltage, the current, and the data distribution amount is out of a predetermined range, the data analysis unit 13 determines that the sensor terminal 11 is abnormal.

The data analysis unit 13 in a case where the sensor terminal 11 is normal/abnormal can be arbitrarily set by the user of the sensor data. For example, in a case where the sensor terminal 11 is abnormal, the data analysis unit 13 excludes the sensing data of the sensor terminal 11 that is abnormal from the sensing data to be analyzed. Furthermore, for example, in a case where a correspondence relationship between internal information (for example, a voltage value) of the sensor terminal 11 and sensing characteristics is known, a value obtained by correcting the sensing data according to the internal information (for example, a voltage value) may be recorded/stored or transmitted to another database server.

Second Embodiment

In the present embodiment, a specific example of the extended area defined by communication protocol will be described.

Figure 4:
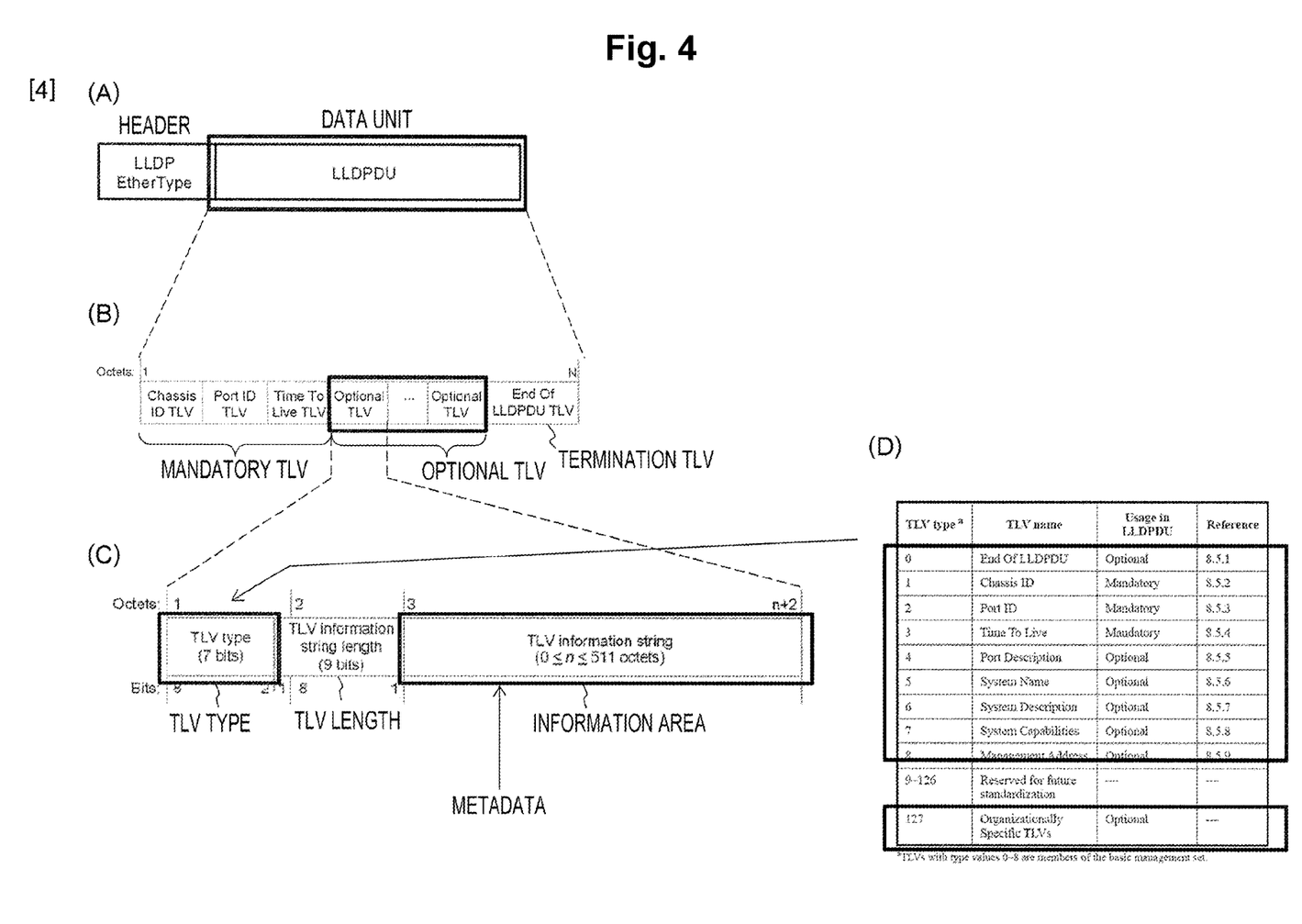
FIG. 4 is a view for explaining an example where equipment information and metadata are stored in an LLDP frame.

FIG. 4 is a view for explaining an example in which the equipment information and the metadata are stored in a frame in a case where the communication protocol operation unit 11d adopts LLDP (see, for example, Non Patent Literature 3) as the communication protocol. FIG. 4(A) is a view for explaining a frame configuration of the LLDP. A frame of the LLDP includes a header and a data unit. FIG. 4(B) is a view for explaining a format of the data unit. The data unit includes a mandatory TLV, an optional TLV, and a termination TLV. FIG. 4(C) is a view for explaining a format of one optional TLV. The optional TLV includes a TLV type, a TLV length, and an information area. FIG. 4(D) is a list of types of the optional TLV. If "1" to "8" are input as the TLV type, various kinds of information such as apparatus name, manufacturer name, a MAC address, or an IP address can be stored as the equipment information in the information area of the optional TLV. In addition, if "127" is input as the TLV type, the information area of the optional TLV becomes the extended area, and the metadata can be stored. As a result, it is possible to collectively collect the metadata regarding normality of the equipment in addition to the sensing data and the equipment information.

Figure 5:
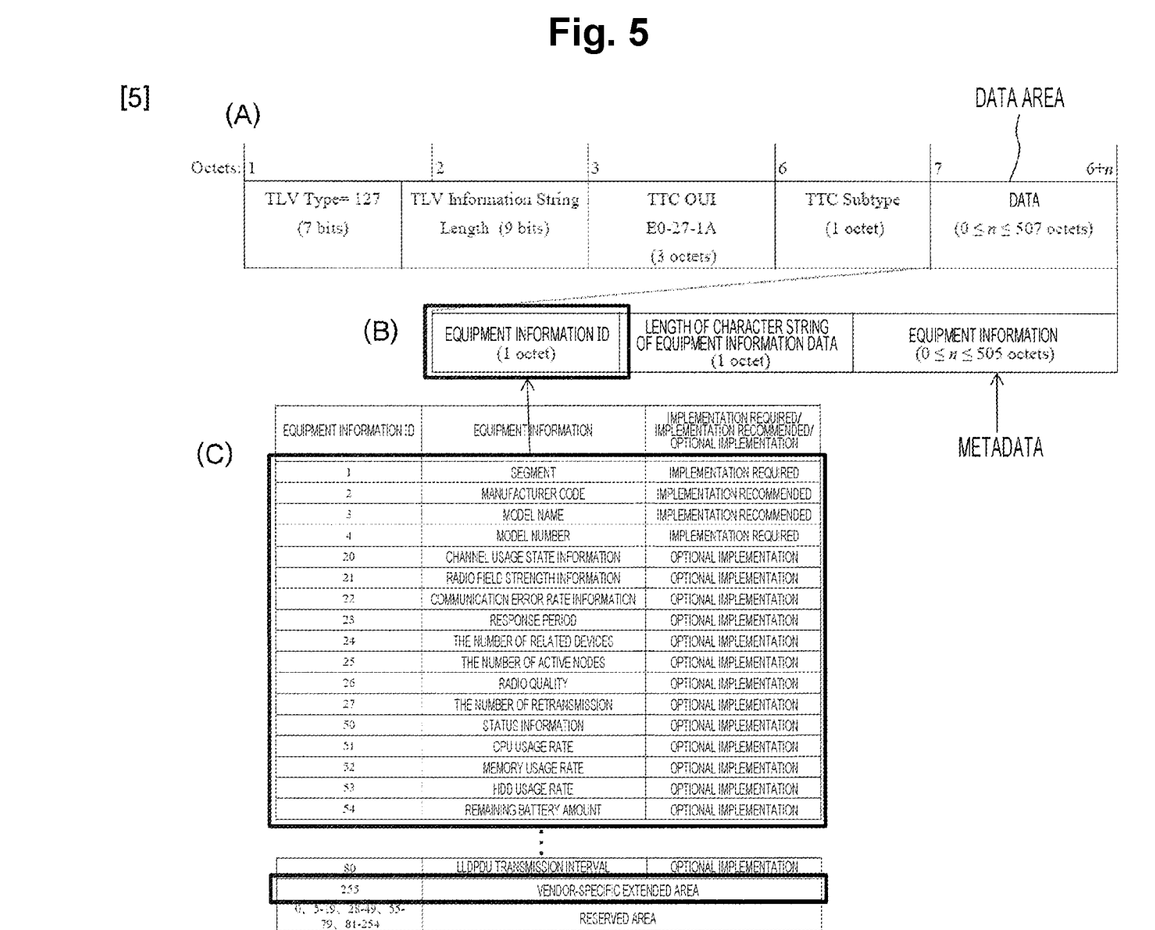
FIG. 5 is a view for explaining an example where the equipment information and the metadata are stored in an HTIP frame.

FIG. 5 is a view for explaining an example in which the equipment information and the metadata are stored in a frame in a case where the communication protocol operation unit 11d adopts HTIP (see, for example, Non Patent Literature 4) as the communication protocol. FIG. 5(A) is a view for explaining a frame configuration of the HTIP. The HTIP frame includes an area describing a TLV type and a length and a data area. FIG. 5(B) is a view for explaining a format of the data area. The data area includes an equipment information ID, an equipment information data length, and equipment information. FIG. 5(C) is a list of equipment information IDs. If "1" to "4", "20" to "27", and "50" to "54" are input as the equipment information IDs, various kinds of information such as apparatus name, manufacturer name, a MAC address, or an IP address can be stored as the equipment information in the equipment information area of the data area. In addition, if "255" is input as the equipment information ID, the equipment information area of the data area becomes a vendor-specific extended area, and the metadata can be stored. As a result, it is possible to collectively collect the metadata regarding normality of the equipment in addition to the sensing data and the equipment information. Although the example of the metadata storage in the extended area/optional area of LLDP or HTIP has been described above as an example, the present disclosure is not limited thereto, and other communication standards such as Wi-Fi, LPWA, and PON may be used as long as the communication function/protocol is included in the sensor terminal 11.

The communication protocol operation unit 11d of the present disclosure can transmit metadata using not only these extended areas but also one or a plurality of extended areas or optional areas that can be used by the user or a vendor, provided in each kind of communication protocol.

Here, the communication protocol operation unit 11d may process the metadata of the own apparatus so as to fall within a data size of the extended area/optional area. For example, a data amount can be reduced by rounding down decimal places of a voltage value to make the voltage value an integer value.

The communication protocol operation unit 11d may fragment the metadata of the own apparatus so as to fall within the data size of the extended area/optional area and store the fragmented metadata in a plurality of frames. For example, in a case where the metadata to be transmitted has 100 bytes while the data size of the extended area/optional area is only 20 bytes, the metadata may be divided into 5 areas by 20 bytes and stored in the extended area/optional area of separate frames and transmitted.

At least one of the sensor terminal 11, the data collection unit 12, or the data analysis unit 13 may further include a control function unit that controls operation of the sensor terminal 11. The detection unit 11e detects metadata in accordance with an instruction from the control function unit. Further, the communication protocol operation unit 11d transmits the metadata at a timing in accordance with an instruction from the control function unit. As a result, a type of the metadata and a timing of storage in the data collection unit 12 can be dynamically changed by the function on the sensor terminal 11 side and the function on the data collection network 15 side (the data analysis unit 13 and the data collection unit 12).

Depending on the sensor terminal 11, available communication protocol may be different. Thus, in the present disclosure, one or a plurality of kinds of communication protocol can be used in accordance with the sensor terminal 11 in the data collection network 15.

Effects of Present Disclosure

In a data collection system of IoT, it is possible to collectively collect metadata regarding normality of equipment in addition to sensing data and equipment information by utilizing communication protocol of a low layer that does not require high performance, so that it is possible to implement an economical and highly reliable system by avoiding increase in cost, complication of operation, and occurrence of an error at the time of associating the sensing data with the metadata, which have been problems in related art.

INDUSTRIAL APPLICABILITY

The present disclosure can be applied to an information communication industry.

REFERENCE SIGNS LIST

11 Sensor terminal
11a Sensor device
11b Equipment information storage processing unit
11c Sensing data storage processing unit
11d Communication protocol operation unit
11e Detection unit
11f Metadata storage processing unit
12 Data collection unit
12a Protocol operation unit
12b Collected data processing unit
12c Data batch transmission unit
13 Data analysis unit
15 Data collection network
301, 302 Data collection system

The invention claimed is:

1. A system configured to collect sensing data from a sensor terminal into a data collection unit using a data collection network, the system comprising:
   the sensor terminal including:
      a sensor device configured to detect the sensing data and equipment information of the sensor terminal; and
      a detection unit configured to detect metadata regarding internal information of the sensor terminal,
      wherein the sensor terminal is configured to process the metadata detected by the detection unit, so that a size of the metadata is no more than a size of an extended area or an optional area of one or more frames, transmit the metadata in the extended area or the optional area of the one or more frames defined in a communication protocol and transmit the sensing data or the equipment information in the one or more frames defined in the communication protocol, wherein the extended area or the optional area is available when an TLV type or an equipment information ID of the one or more frames is equal to a predetermined value, and
   the data collection unit associating the sensing data, the equipment information, and the metadata with each other on a basis of information for identifying the sensor terminal described in the frame.

2. The system according to claim 1, wherein one or more communication protocols are used in the data collection network in accordance with the sensor terminal.

3. The system according to claim 1, wherein the sensor terminal is configured to divide the metadata detected by the detection unit into a plurality of parts, so that a size of each part is no more than the size of the extended area or the optional area and store the plurality of parts in a plurality of frames, respectively.

4. The system according to claim 1, wherein the sensor terminal is configured to:
accumulate the metadata detected by the detection unit for a certain period of time, and record the accumulated metadata or transmit a result of processing on the accumulated metadata.

5. The system according to claim 1, further comprising:
a control function unit configured to control at least one of a type of metadata to be transmitted by the sensor terminal or a timing at which the sensor terminal configured to transmit the metadata.

6. A method to be executed by a system that collects sensing data from a sensor terminal into a data collection unit using a data collection network, the method comprising:
detecting the sensing data and equipment information of the sensor terminal;
detecting metadata regarding internal information of the sensor terminal;
processing the metadata, so that a size of the metadata is no more than a size of an extended area or an optional area of one or more frames;
transmitting the metadata in the extended area or the optional area of the one or more frames defined in a communication protocol, wherein the extended area or the optional area is available when an TLV type or an equipment information ID of the one or more frames is equal to a predetermined value;
transmitting the sensing data or the equipment information in the one or more frames defined in the communication protocol; and
associating the sensing data, the equipment information, and the metadata with each other on a basis of information for identifying the sensor terminal described in the frame.

7. A sensor terminal configured to transmit sensing data to a data collection unit using a data collection network, the sensor terminal comprising:
a sensor device configured to detect the sensing data and equipment information of the sensor terminal; and
a detection unit configured to detect metadata regarding internal information of the sensor terminal,
wherein the sensor terminal is configured to process the metadata detected by the detection unit, so that a size of the metadata is no more than a size of an extended area or an optional area of one or more frames, transmit the metadata in the extended area or the optional area of the one or more frames defined in a communication protocol and transmit the sensing data or the equipment information in the one or more frames defined in the communication protocol, wherein the extended area or the optional area is available when an TLV type or an equipment information ID of the one or more frames is equal to a predetermined value.

8. The system according to claim 2, wherein the sensor terminal is configured to process the metadata detected by the detection unit so that a size of the metadata is no more than a size of the extended area or the optional area of the one or more frames.

9. The system according to claim 2, wherein the sensor terminal is configured to divide the metadata detected by the detection unit into a plurality of parts, so that a size of each part is no more than a size of the extended area or the optional area and store the plurality of parts in a plurality of frames, respectively.

10. The system according to claim 1, wherein the sensor terminal is configured to divide the metadata detected by the detection unit into a plurality of parts, so that a size of each part is no more than a size of the extended area or the optional area and store the plurality of parts in a plurality of frames, respectively.

11. The system according to claim 2, wherein the sensor terminal is configured to:
accumulate the metadata detected by the detection unit for a certain period of time, and
record the accumulated metadata or transmit a result of processing on the accumulated metadata.

12. The system according to claim 1, wherein the sensor terminal is configured to:
accumulate the metadata detected by the detection unit for a certain period of time, and
record the accumulated metadata or transmit a result of processing on the accumulated metadata.

13. The system according to claim 3, wherein the sensor terminal is configured to:
accumulate the metadata detected by the detection unit for a certain period of time, and
record the accumulated metadata or transmit a result of processing on the accumulated metadata.

14. The system according to claim 2, further comprising:
a control function unit configured to control at least one of a type of metadata to be transmitted by the sensor terminal or a timing at which the sensor terminal configured to transmit the metadata.

15. The system according to claim 1, further comprising:
a control function unit configured to control at least one of a type of metadata to be transmitted by the sensor terminal or a timing at which the sensor terminal configured to transmit the metadata.

16. The system according to claim 3, further comprising:
a control function unit configured to control at least one of a type of metadata to be transmitted by the sensor terminal or a timing at which the sensor terminal configured to transmit the metadata.

17. The system according to claim 1, wherein the sensor terminal is configured to convert the metadata into a shortened code, so that a size of the shortened code is no more than the size of the extended area or the optional area of the one or more frames.

18. The system according to claim 1, wherein the sensor terminal is configured to round down a decimal part of the metadata to make the metadata an integer value.

19. The system according to claim 1, wherein the metadata comprises at least one of a CPU usage rate, a memory usage amount, a voltage, a current, or a data distribution amount of the sensor terminal.

* * * * *